Jan. 6, 1959   J. F. ZALESKI   2,867,800
MICROWAVE PHASING SYSTEM
Filed Sept. 18, 1948

Inventor
JOHN F. ZALESKI
By
H. A. Mackey
Attorney

United States Patent Office 2,867,800
Patented Jan. 6, 1959

2,867,800

MICROWAVE PHASING SYSTEM

John F. Zaleski, Queens Village, N. Y., assignor to General Precision Laboratory Incorporated, a corporation of New York Application September 18, 1948, Serial No. 49,937

12 Claims. (Cl. 343—13)

This invention relates to a pulsed microwave generator system wherein the phase of oscillations composing successive pulses is maintained substantially constant.

Various systems have been proposed for utilizing the principle known as Doppler shift for determining the relative speed of two objects. In general this phenomenon is utilized by transmitting a signal wave from one object, reflecting it from the other, receiving it on the first object, and comparing the frequency of the received signal with that of the transmitted signal. The difference in frequency of these two signals, which is the Doppler shift or Doppler frequency, is then a measure of the relative speed of the two objects.

Such systems are extremely useful. For example, they provide a means to determine the horizontal speed of an airplane or ship relative to the earth, entirely free of errors due to air currents or sea currents. To determine true speed by use of the Doppler principle a signal is transmitted from the vehicle toward the earth's surface and along the path of motion, and the signal reflected from the earth's surface or the echo signal is received on the vehicle. The difference in frequency between the transmitted and reflected signals is measured by suitable means to indicate directly without computation the true speed of the vehicle regardless of any movement of the medium through which the vehicle is traveling.

Such a system, in which the phenomenon of Doppler shift is used to determine true speed and also true direction of travel is disclosed in the copending application, Serial No. 749,184, filed May 20, 1947 of W. J. Tull et al.

In such systems it is advantageous to transmit the signal to be reflected in the form of high frequency electromagnetic waves in order to secure accuracy at high vehicle speeds, and also to break the transmitted signal into short, separated pulses or trains, to facilitate the isolation of transmitted and reflected signals while using the same antenna or antennas for both transmission and reception.

In systems of this type the transmitted pulse is of short duration and during the long space between pulses no signal is transmitted. Therefore at the time a reflected signal is received no signal may be available with which to compare it and thereby to determine the Doppler shift in frequency, and thus the speed of the vehicle. In order that such a comparison signal may be available it therefore is necessary to generate oscillations locally which are either of the same frequency as the transmitted pulse oscillations or are of some lower or intermediate frequency definitely related to them. By this means there is available at all times a signal with which the frequency of the received signal or its intermediate frequency may be compared regardless of the time of its reception, so that the change in frequency undergone by the signal in being transmitted, reflected and received, which is the Doppler shift, may be determined.

But merely to provide a comparison signal of the same or intermediate frequency as the transmitted pulse oscillations is not enough to insure the derivation of useful information from the received signals. The locally generated continuous signals must have not only the same frequency, but also must have the same relative phase as the oscillations of the transmitted pulses. More specifically, each received pulse must be compared with a comparison signal to derive the Doppler shift or beat difference frequency, and this beat difference frequency amplitude is then a function of the phase difference at the start of the two compared signals. Since the phase at the start of the received pulse is a function of the phase at the start of the transmitted pulse which generated it, the phase at the start of the reference signal must obviously also be a related function of the same transmitted pulse initial phase, in order that successive beat difference pulse amplitudes shall define a beat frequency.

Heretofore, generators of microwave pulses have been operated with random phase relations from pulse to pulse, each pulse starting at a random point in the microwave cycle. This point therefore would have no definite relation to the reference microwave phase at the time of comparison of it with the received pulse.

It is a purpose of the present invention, therefore, to provide a system in which the phase of the oscillations produced by a microwave pulse generator may be controlled by a source of continuous oscillations of constant frequency so that there is an unvarying phase relation between the oscillations of the transmitted pulse signals and the oscillations of the locally generated signals used for comparison purposes.

Additionally, it is a purpose of the present invention to provide a system such that while the same antenna is used for both transmission and reception, signals generated by the reference oscillator used to phase the generator of microwave pulse signals are transmitted to the latter but are effectively prevented from being radiated by the antenna or entering the receiver, and also essentially all of the energy of the microwave pulse generator is radiated by the antenna while the remainder of the system is effectively isolated therefrom.

To accomplish this purpose a microwave pulse generator, reference oscillator, receiver and antenna are provided, being connected by means of wave guides and separated by TR and ATR tubes so arranged that when the latter are caused to fire by the relatively high power of a transmitted pulse signal essentially all of the generated pulse power is transmitted to the antenna and both reference oscillator and receiver are effectively isolated from the transmitted pulse signal. At other times, however, between the end of each transmitted pulse signal and the beginning of the next, the TR and ATR tubes are unfired and substantially all of the energy generated by the reference oscillator is fed to the pulse generator but is prevented from being radiated by the antenna and also is prevented from entering the receiver.

The exact nature of the invention will be more clearly understood from the following detailed description when considered in connection with the accompanying drawings, in which.

Figure 1:
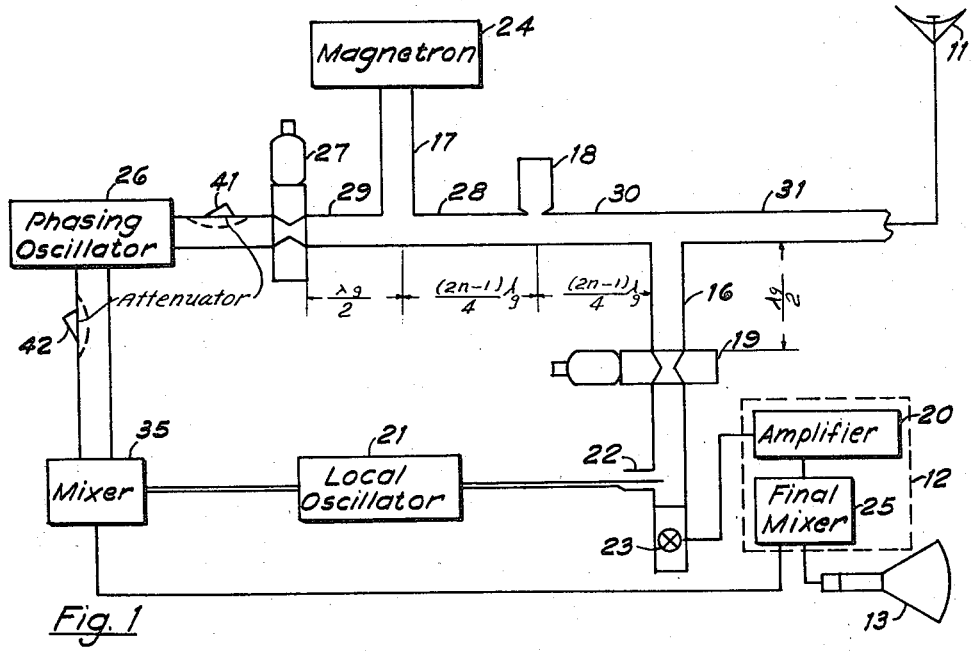
Figure 1 is a schematic representation of one form of the invention wherein the phasing oscillator may be isolated from the remainder of the system by a TR tube.

Referring now to Fig. 1, a magnetron or other microwave pulse generator, generating microwave oscillations in pulses, trains or groups separated in time by non-transmitting periods, is indicated by block 24. It may generate, for example, microwaves of 3.25 cm. wavelength in space, although any other microwave length may alternatively be used instead. The microwave generator 24 is connected to a suitable microwave antenna 11 by microwave hollow guide circuit consisting of the pulse generator branch 17, impedance matching sections 28 and 30 and antenna branch 31, which for instance for the exampled wavelength might be rectangular with inside dimensions of 0.4 inch and 0.9 inch. In the drawings such guides are shown schematically, with a short side presented to the observer. To the junction of microwave pulse generator branch 17 and impedance matching section 28 there is joined phasing oscillator branch 29 and a phasing or reference oscillator represented by block 26. This oscillator may be a reflex klystron capable of continuous generation of a few watts of stable frequency energy at substantially the frequency to be emitted by the microwave pulse generator. In order to control the output energy level of the phasing oscillator 26 any suitable means may be employed such as the control of the voltage supply to the oscillator or the employment of adjustable flap attenuators in the output branches as indicated at 41 and 42. To the junction of the impedance matching section 30 and the antenna branch 31 there is connected a receiving branch guide 16, which terminates in a detector of microwaves, such as a crystal detector or mixer 23, the output of which enters receiver 12, which may consist of amplifier 20 suitable, as an example, for amplifying radio frequencies in the neighborhood of 30 megacycles, and a final mixer 25 which may be any nonlinear device such as a crystal demodulator. The output of the latter, ordinarily in the audio frequency range, may be measured in frequency by any of several well-known means, for instance by a cathode ray tube 13, in which the number of cycles per unit of length can be counted and interpreted as cycles per second. A local oscillator 21, which may be a reflex klystron tube, generating oscillations of a frequency differing from that of the microwave pulse generator by, for example, 30 megacycles, is connected both to the receiving branch and to a mixer 35, which is also connected to both the phasing oscillator 26 and the final mixer 25. Two TR tubes 19 and 27 and one ATR tube 18 serve as voltage-operated gates or barriers in the wave guide system. These tubes and their functions may be described as follows:

The TR tube 19 or 27 consists of a spark or glow discharge gap in a partially evacuated space. It is installed interposed in a wave guide, with the discharge axis in line with the wave guide E-lines. If the wave guide potential rises above the gap breakdown value the gap discharges, electrically short circuiting the guide during the discharge time. When not discharging, the tube has little or no effect on passage of microwaves through the guide except in the case where the TR cavity is of high Q—it then is frequency selective. The ATR tube 18 is contained in a length of wave guide one-quarter wavelength long or an odd multiple thereof. One end of this guide is closed with a metal plate, the other end is closed with an insulating plate. A discharge gap is arranged to be effectively in the plane of the insulating plate and the tube is partially evacuated. The tube is installed with the insulating plate as a continuation or part of a broad wall of a wave guide. If the potential within the tube rises above the breakdown value characteristic of the tube the gap discharges, electrically placing a short circuit in the plane of the insulating plate. The wave guide then behaves as if the ATR were not present and the guide walls were continuous. However, when the gap is not discharging, the closed end one-quarter wavelength away from the main wave guide reflects high impedance to the plane of the insulating plate, and since the tube is connected as a series stub in a wave guide, the guide acts as if it were open or terminated in a nearly infinite impedance at that point.

In Fig. 1, TR tube 19 is installed so that its location in the receiving guide branch 16 is one-half wavelength in the guide from the antenna branch 31. ATR tube 18 is installed at a certain location to be described later, between the receiving branch 16 and the microwave pulse generator branch 17. TR tube 27 is installed in the phasing oscillator branch 29 at an exact location to be described later.

These locations of the TR and ATR tubes and the proportioning of the guide system in general depend on well-known principles of microwave technology, several of which are:

(1) A closed quarter-wave guide reflects high impedance to its open end.

(2) A closed half-wave guide reflects low impedance to its open end.

(3) An open half-wave guide reflects high impedance to its open end.

(4) The impedance of a right angle turn in a wave guide can approximately be matched out by a closed-end stub, the closed end of which is approximately a half-wave length from the right angle turn.

In Fig. 1 a pulse emitted by the microwave pulse generator 24 is guided by the pulse generator branch 17, impedance matching sections 28 and 30 and antenna branch 31 to the antenna 11. The high energy level of this pulse causes TR tube 27 to fire short circuiting the phasing oscillator branch 29 at this point. The phasing oscillator branch 29, therefore, acts as a stub having a closed end at the location of the TR tube 27. By making the length of the phasing oscillator branch 29 approximately one-half wavelength or multiple thereof, the low impedance of the closed end will be reflected to the right angle turn caused by the juncture of the generator branch 17 and impedance-matching section 28 and the impedance of this angle is matched out allowing the energy to be transmitted unimpeded from the generator branch 17 to and through the impedance-matching section 28. The high level power of the pulse has also caused ATR tube 18 and TR tube 19 to fire. The firing of ATR tube 18 closes the gap in the junction of impedance-matching sections 28 and 30 permitting the transfer of microwave energy between these sections. At the same time the firing of tube 19 short circuits the receiving branch 16 at this location and since the TR tube 19 is located one-half wavelength from the juncture of the impedance-matching section 30 and the antenna branch 31 the short circuit is reflected to this juncture so that the pulse energy passes to the antenna 11 as if the receiving branch were absent and the guide continuous. The phasing oscillator 26 is in continuous operation but its output is short circuited by the firing of TR tube 27 so that the energy generated by the phasing oscillator does not pass this point.

In the interval between pulses generated by the microwave generator 24, the energy level incident on the circuit by reason of the energy generated by the phasing oscillator 26 and the received signal is low and the TR tubes 19 and 27 and ATR tube 18 are unfired. The short circuit imposed by the TR tube 27 is thus removed and the energy is transmitted to the phasing oscillator branch 29. At the same time ATR tube 18 being also unfired is made, together with impedance-matching section 28, to reflect low impedance to the right angle bend of the phasing oscillator branch 29 and pulse generator branch by making the impedance-matching section 28 approximately a quarter of a wavelength or odd multiple thereof in length. Since the closed metal end of the ATR tube 18 is a quarter of a wavelength from the face of the guide to which it is attached and the section 28 is a quarter wavelength or odd multiple thereof in length, there is a closed end one-half wavelength or multiple thereof from the junction of the branches 29 and 17 on the side opposite the phasing oscillator 26. Looking from the phasing oscillator there is then a closed end a half-wavelength from the juncture of branches 29 and 17 and this closed end reflects low impedance to this point acting as though the matching section 28 is short circuited at this point. The energy generated by the phasing oscillator, therefore, flows through the pulse generator branch 17 acting as means to force each generated pulse into the proper phase and at the same time is isolated by the matching section 28 from the antenna so that none of the phasing oscillator energy is radiated.

Looking at the system from the antenna end a similar situation obtains as regards the received signal. The impedance-matching section 30 is made approximately a quarter of a wavelength long or an odd multiple thereof. Looking from the antenna end of the system, there is therefore, the closed metallic end of the ATR tube 18 one-half wavelength or a multiple thereof on the opposite side of the junction of the antenna branch 31 and the receiving branch 16. This closed end reflects low impedance to this junction of antenna branch 31 and receiving branch 16 causing the received signal to flow into the receiving branch 16 without attenuation and isolating this signal from the remainder of the system.

It will be understood by those skilled in the microwave art that the wavelength referred to is the wavelength of the microwaves in the wave guide usually referred to by the symbol $\lambda_g$ and that this wavelength departs from the wavelength in air by an amount which depends on the dimensions of the wave guide used. Likewise it will be recognized that dimensions mentioned in terms of quarter and half wavelengths are approximate only and that in any particular system constructed they may be varied by a small constant to allow for any mismatch that may result from the right angle junction of two different wave guide sections.

Because the TR tube 19 is not fired, received signals are transmitted through the receiving branch 16 and actuate the mixer 23. Local oscillator 21 also injects energy of a different frequency from that of the received signal through injection fitting 22 into detector 23, and the demodulated or beat frequency, for example 30 mc., is amplified and fed to final mixer 25. A portion of the signal generated by the phasing oscillator 26 and a portion of the signal generated by the local oscillator 21 both enter mixer 35, which delivers the difference of these frequencies to final mixer 25; the Doppler shift frequency is then produced and is indicated as on cathode ray tube 13.

The received signal, which is the received echo of the transmitted signal, differs in frequency from the transmitted signal by reason of the Doppler effect if the object from which the signal is transmitted and on which the echo signal is received is moving relative to the object which reflects the signal, and this difference in frequency is a measure of the speed of the one object toward or away from the other.

Assuming, for example, that the system of Fig. 1 is carried on an airplane and the pulse signals generated by the microwave pulse generator are transmitted toward the earth in a direction having a component along the true course or ground track of the airplane, are reflected by the earth and the reflected or echo signals received by the system, then by determining the difference in frequency between the transmitted and received signals the true speed of the airplane with respect to the earth's surface may be obtained in the following manner:

When the mircowave pulse generator is pulsed, signal energy fires ATR tube 18 and passes it, fires TR tube 19 and passes the receiving branch 31, and actuates the antenna 11. This energy also fires TR tube 27 and is reflected by the same, thus being barred from phasing oscillator 26. This transmitted signal will have a frequency represented, let us say, by $f$.

Assuming that the airplane is approaching the reflecting target, the reflected or echo signal will have an increased frequency, represented, let us say, by $f+\Delta f$ where $\Delta f$ is the Doppler shift frequency. By the time of reception of the echo signal the transmitting pulse will have ended and the TR and ATR tubes will have ceased to fire. The received signal from the antenna therefore enters the receiving guide branch 16 and is prevented by ATR tube 18 from entering the pulse generator branch 17 as previously explained. The received signal passes TR tube 19 and enters detector 23, where it is mixed with a portion of the signal from local oscillator 21 which may be of a frequency represented by $f-30$ megacycles. In detector 23 therefore, demodulation results in the production of a signal of frequency 30 megacycles plus the Doppler frequency, by substraction as follows:

$$f+\Delta f-f+30 \text{ mc.}=30 \text{ mc.}+\Delta f$$

A portion of the signal emitted by phasing oscillator 26, also of frequency $f$, is carried to mixer 35, together with a portion of the signal, $f-30$ mc., emitted by local oscillator. The output of mixer 35 is the difference frequency, as follows:

$$f-f+30 \text{ mc.}=30 \text{ mc.}$$

The output of 30 megacycles is fed to the final mixer 25 which forms a portion of receiver 12 and which also has an input of 30 mc. $+\Delta f$ from detector 23, as above described. Mixing these results in the Doppler frequency alone, as it is the difference between the two input frequencies, thus:

$$30 \text{ mc.}+\Delta f-30 \text{ mc.}=\Delta f$$

Hence the output of the final mixer 25 represents a signal of the frequency of the Doppler shift in frequency and this frequency may be measured in any well-known manner, as by the cathode ray tube 13, to produce an indication of speed.

As heretofore shown, however, the output of mixer 25 will yield useful information only providing that the microwaves composing the pulse signals generated and transmitted by the microwave pulse generator 24 have the same relative phase as the signals used for comparison purposes, namely, those generated by the phasing and reference oscillator 26.

Signals generated by this oscillator 26 pass through TR tube 27 without hindrance to the pulse generator branch 17 and into magnetron 24 at all times that sufficient energy has not been built up by magnetron 24 to fire TR tube 27. The critical period for phasing is during the build-up period of the magnetron, when the energy fed thereto by the phasing and reference oscillator 26 forces it to assume the same phase relation as the unvarying phase relation of the continuous wave signals generated by the phasing and reference oscillator 26.

The level of power properly to phase the magnetron 24, derived from phasing oscillator 26, must not be sufficient to break down the TR tube 27 since, should it fire, the phasing signal will not be transmitted through it to the magnetron 24.

Figure 2:
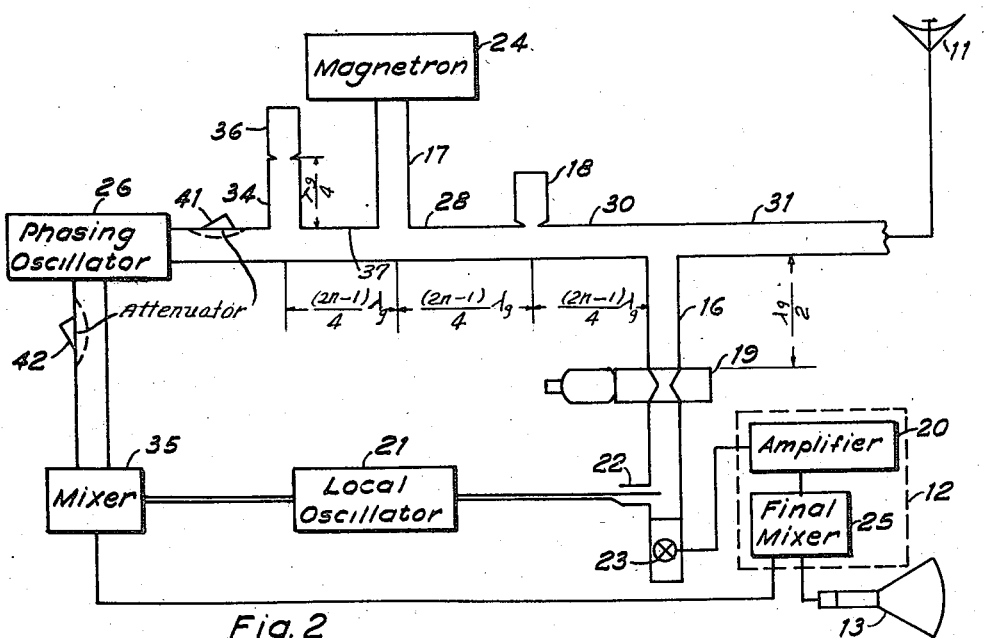
Figure 2 is a schematic representation of another form of the invention wherein the phasing oscillator may be isolated from the remainder of the system by a wave guide branch and an ATR tube.

In Fig. 2 there is disclosed a modification of the system of Fig. 1 wherein an ATR tube 36 mounted on a wave guide stub having a length of a quarter wavelength has been substituted for the TR tube 27. Additionally, the dimension of the phasing oscillator branch 37 has been made approximately a quarter wavelength or odd multiple thereof rather than a half wavelength long as is the case of the similar branch 29 in the system of Fig. 1. The other portions of the system remain the same and the same reference characters have been applied to similar elements.

In the system of Fig. 2 when a pulse signal is generated by the wicrowave generator 24 the energy level in the system is high and ATR tubes 36 and 18 and TR tube 19 fire, the functions of ATR tube 18 and TR tube 19 being as previously described. The firing of ATR tube 36 places a short circuit across the upper end of the stub 34 and there is in effect a closed end at this point one quarter of a wavelength from the phasing oscillator branch 37. There is then a high impedance or open circuit condition present in the wave guide branch leading from the microwave pulse generator to the phasing oscillator preventing energy transfer between these devices. On the other hand looking from the antenna towards the microwave pulse generator there is a closed end a half wavelength or multiple thereof past the junction of the pulsed generator branch 17 and the impedance-matching section 28. This results in a reflection of low impedance across the branch 37 at this juncture point so that energy is transmitted from the branch 17 to the branch 28 without undue attenuation and pulse signals are transmitted to the antenna 11 for radiation thereby.

When, however, the pulsed oscillator 24 is not fired and the system is in condition for receiving signals the energy level therein is so low that TR tube 19 and ATR tubes 18 and 36 are unfired. Under these conditions the closed metal end of the ATR tube 36 is a half a wavelength from the phasing oscillator branch 37, one quarter of a wavelength being accounted for by the length of the tube 37 and the other quarter by the length of the stub 34. This closed end reflects low impedance to the branch 37 and it is as though the walls of this branch were continuous so that energy generated by the phasing oscillator is transmitted to the pulsed generator 24 to cause the pulses generated to have a fixed phase relation.

The ATR tube 18 acts in the same manner as previously discussed in connection with Fig. 1 to reflect low impedance to the appropriate sides of the juncture of the pulsed oscillator branch 17 and phasing oscillator branch 37 and the juncture of the antenna branch 31 and receiving branch 16 so that the energy is transmitted at these points without undue attenuation and at the same time the energy generated by the phasing oscillator and the energy represented by the received signal are isolated from each other and confined to appropriate portions of the system.

What is claimed is:

1. In a system for transmitting high frequency pulse signals, receiving the echoes thereof and for maintaining the phase of the oscillations of the pulse signals substantially constant, a generator of high frequency pulse signals, a generator of continuous wave oscillations of substantially the same frequency as the oscillation of said high frequency pulse signals, a receiver, an antenna, a main wave guide energy transmission circuit connected to said antenna, a branch wave guide circuit connecting said receiver to said main circuit, branch wave guide circuits connecting said pulse signal generator and said continuous wave generator to each other and to said main circuit and means located in said main circuit between the juncture of the receiving branch circuit with said main circuit and the juncture of the pulse signal and continuous wave branches with each other and said main circuit for reflecting a low impedance across said main circuit at its juncture with said pulse signal and continuous wave guide branches and a second low impedance across said main circuit at its juncture with said receiving branch at the side remote from said antenna during the interval between pulse signals and for removing said low impedances in response to the occurrence of said high frequency pulse signals.

2. A system according to claim 1 having means in said continuous wave branch circuit for isolating said continuous wave oscillator from the main energy transmission circuit during the periods of pulse signal generation by said pulse signal generator and for providing a low impedance juncture between the pulse generator circuit and the main transmission circuit.

3. A system according to claim 2 having means in said receiving branch circuit for isolating said receiver from said main energy transmission circuit during periods of pulse transmission.

4. In a system for transmitting high frequency pulse signals, receiving echoes thereof and for controlling the phase relationship of successive pulse signals, a pulsed signal generator, a generator of continuous wave oscillations of substantially the same frequency as the oscillations of said high frequency pulse signals, a wave guide circuit common to and interconnecting said pulsed signal generator and said continuous wave generator, means in said common circuit actuated by the pulse signals for preventing the imposition thereof on said continuous wave oscillator said means being inactive during the intervals between generation of pulsed signals whereby said continuous wave oscillations are impressed on said pulsed oscillator just prior to the generation of a pulse thereby to cause the pulsed signal when generated to have the desired phase relation, an antenna, a main wave guide circuit connecting said common circuit to said antenna, a receiver, a branch wave guide circuit connecting said receiver to said antenna, means for preventing the imposition of said pulse signals on said receiver, means providing a low impedance across said main circuit at its junction with said receiver branch circuit on the side remote from said antenna and a second low impedance across said main circuit at its junction with said common circuit during intervals between successive pulse signals and for removing said low impedances in response to the occurrence of said high frequency pulse signals.

5. In a system of the class described, a microwave pulse generator generating pulse signals of a relatively high energy level, a generator of continuous wave oscillations of relatively low energy level and of substantially the same frequency as the oscillations of said pulse signals, a receiver for receiving echoes of said pulse signals, an antenna for transmitting said pulse signals and for receiving the echoes thereof, a circuit interconnecting said pulse generator and said continuous wave generator comprising a first microwave transmission branch connected at one end to said continuous wave generator, a second microwave transmission branch connected at one end to said pulse generator and said first and second branches being connected together at their opposite ends at right angles with respect to each other forming a first right angle junction; a circuit interconnecting said antenna and said receiver comprising a third microwave transmission branch connected at one end to said antenna, a fourth microwave transmission branch connected at one end to said receiver, said third and fourth branches being connected together at their other ends at right angles with respect to each other forming second right angle junction; a microwave transmission circuit connecting said first and second right angle junctions constituting a continuation of said first and third microwave transmission branches, means located in said last mentioned microwave transmission branch for isolating the circuit composed of said first and second branches from the circuit composed of said third and fourth branches during the intervals that a low level of energy is impressed on the system and for connecting said second microwave transmission branch to said third microwave transmission branch and said antenna during the intervals that a high level of energy is impressed on system, means in said first microwave transmission branch for preventing the imposition of pulse signals on said continuous wave generator and means in said fourth microwave transmission branch for preventing the imposition of pulse signals on said receiver.

6. A system according to claim 5 provided with means for reflecting low impedance at such a location in said first right angle junction during the intervals when energy of a relatively low level is impressed on said system that a low loss junction is formed between said first and second microwave transmission branches during intervals between pulse transmission.

7. A system according to claim 6 provided with means for reflecting low impedance at such a location in said first mentioned right angle junction during intervals when energy of a relatively high level is impressed on said system that a low loss junction is formed between said second microwave transmission branch and the microwave transmission circuit connecting said first and second right angle junctions during periods of pulse transmission.

8. A system according to claim 7 provided with means for reflecting a low impedance at such a location in said second right angle junction during the intervals when energy of a relatively low level is impressed on said system that a low loss junction is formed between said third and fourth microwave transmission branches during intervals between pulse transmission.

9. A system according to claim 8 in which the means for reflecting low impedance at said first right angle junction during intervals when energy of a relatively low level is impressed on said system comprises an anti-transmit-receive circuit connected to the microwave transmission circuit at a distance of approximately a quarter wavelength or odd multiple thereof from said first right angle junction.

10. A system according to claim 9 in which the means for reflecting a low impedance at said second right angle junction during intervals when energy of a relatively low level is impressed on said system comprises said anti-transmit-receive circuit connected to the microwave transmission circuit at a distance of approximately a quarter wavelength or odd multiple thereof from said second right angle junction.

11. A system according to claim 10 in which the means for reflecting a low impedance at said first mentioned junction during intervals when energy of a relatively high level is impressed on said system comprises a transmit-receive circuit connected in said first microwave transmission branch at a distance of approximately a half wavelength or multiple thereof from said first right angle junction.

12. A system according to claim 10 in which the means for reflecting a low impedance at said first mentioned junction during intervals when energy of a relatively high level is impressed on said system comprises an anti-transmit-receive circuit connected to one end of a stub having a length of approximately one quarter of a wavelength, the other end of the stub being connected to said first microwave transmission branch at a distance of approximately a quarter wavelength or odd multiple thereof from said first right angle junction.

References Cited in the file of this patent
UNITED STATES PATENTS

| | | |
|---|---|---|
| 1,750,668 | Green | Mar. 18, 1930 |
| 2,392,380 | Varian | Jan. 8, 1946 |
| 2,406,316 | Blumlein et al. | Aug. 27, 1946 |
| 2,412,161 | Patterson | Dec. 3, 1946 |
| 2,412,315 | Brown | Dec. 10, 1946 |
| 2,416,367 | Young | Feb. 25, 1947 |
| 2,422,190 | Fiske | June 17, 1947 |
| 2,424,263 | Woodyard | July 22, 1947 |
| 2,450,945 | Eaton | Oct. 12, 1948 |

OTHER REFERENCES

M. I. T. Radar School Staff: "Principles of Radar," second edition, 1946, pp. 11—1 to 11—18.

Ridemour: "Radar System Engineering." First edition, copyright June 23, 1947, pp. 407 to 411.